US011783342B1

(12) United States Patent
Griffin

(10) Patent No.: US 11,783,342 B1
(45) Date of Patent: Oct. 10, 2023

(54) BLOCKCHAIN BLACKLIST ANTI-MONEY LAUNDERING SYSTEM (BBAMLS)

(71) Applicant: Wells Fargo Bank, N.A., San Francisco, CA (US)

(72) Inventor: Phillip H. Griffin, Raleigh, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 217 days.

(21) Appl. No.: 16/506,498

(22) Filed: Jul. 9, 2019

(51) Int. Cl.
G06Q 20/40 (2012.01)
H04L 9/06 (2006.01)
H04L 9/32 (2006.01)
H04L 9/00 (2022.01)

(52) U.S. Cl.
CPC ....... *G06Q 20/4016* (2013.01); *G06Q 20/4014* (2013.01); *H04L 9/0637* (2013.01); *H04L 9/3263* (2013.01); *H04L 9/50* (2022.05); *H04L 2209/56* (2013.01)

(58) Field of Classification Search
CPC ............ G06Q 20/4016; G06Q 20/4014; H04L 9/0637; H04L 9/3263; H04L 2209/38; H04L 2209/56; H04L 9/50
See application file for complete search history.

(56) References Cited

U.S. PATENT DOCUMENTS

| 10,866,865 | B1* | 12/2020 | Morkel et al. ...... G06F 16/2379 |
| 2003/0095665 | A1* | 5/2003 | Wheeler et al. ... H04L 63/0428 380/282 |
| 2005/0097336 | A1* | 5/2005 | Canard et al. ... G06Q 20/40975 713/185 |
| 2011/0167060 | A1* | 7/2011 | Merz et al. ....... G06F 16/24558 707/727 |
| 2018/0115538 | A1* | 4/2018 | Blake ..................... H04L 9/14 |
| 2018/0189789 | A1* | 7/2018 | Caldera ............... G06Q 20/381 |

(Continued)

FOREIGN PATENT DOCUMENTS

| CN | 107085812 A | 8/2017 | |
| WO | 2019078880 A1* | 4/2019 | ............... G06Q 10/10 |

OTHER PUBLICATIONS

Arini, Nick, "Corda Blockchain on the AWS cloud," 2018 (Year: 2018).*

(Continued)

*Primary Examiner* — Scott C Anderson
*Assistant Examiner* — James H Miller
(74) *Attorney, Agent, or Firm* — Foley & Lardner LLP

(57) ABSTRACT

A system and method for checking the sanction status of an entity to determine whether the entity is prohibited from engaging in transactions with an organization. The system and method include receiving a request to form an agreement between an organization and an entity and maintaining, in a sanctioned entity blacklist, associations between a plurality of entities and a plurality of identifiers. Each identifier of the plurality of identifiers indicates that a respective entity of the plurality of entities has sanctioned entity status prohibiting the respective entity from engaging in a transaction with one or more organizations. The system and method include determining a sanctioned entity status associated with the entity based on a digital certificate and the sanctioned entity blacklist. The system and method include generating, responsive to determining the sanctioned entity status associated with the entity, an error condition indicating that the digital certificate failed validation.

30 Claims, 3 Drawing Sheets

(56) References Cited

U.S. PATENT DOCUMENTS

| | | | | |
|---|---|---|---|---|
| 2020/0134711 | A1* | 4/2020 | Dawson | H04L 9/3239 |
| 2020/0151266 | A1* | 5/2020 | Takeuchi et al. | G06F 16/2379 |
| 2020/0160344 | A1* | 5/2020 | Jevans et al. | G06Q 20/065 |
| 2020/0175155 | A1* | 6/2020 | Bhamidipati et al. | H04L 9/50 |
| 2020/0175156 | A1* | 6/2020 | Bhamidipati et al. | H04L 9/0637 |
| 2020/0403809 | A1* | 12/2020 | Chan et al. | H04L 9/3265 |
| 2021/0201396 | A1* | 7/2021 | Soundararajan et al. | G06Q 20/388 |

OTHER PUBLICATIONS

Bradley, Michael, Davis Gorman, Matt Lucas, and Matthew Golby-Kirk. Getting Started with Enterprise Blockchain: A Guide to Design and Development. O'Reilly Media, Inc., Apr. 2019 (Year: 2019).*

Zhang, Yuanyu, Shoji Kasahara, Yulong Shen, Xiaohong Jiang, and Jianxiong Wan. "Smart contract-based access control for the internet of things." IEEE Internet of Things Journal 6, No. 2 (2018): 1594-1605. (Year: 2018).*

* cited by examiner

300

receiving, by one or more processors and from an entity device, a request to form an agreement between an organization associated with the one or more processors and an entity associated with the entity device, the request comprising a digital certificate
302

↓ maintaining, by the one or more processors and in a sanctioned entity blacklist, associations between a plurality of entities and a plurality of identifiers, each identifier of the plurality of identifiers indicating that a respective entity of the plurality of entities has sanctioned entity status prohibiting the respective entity from engaging in a transaction with one or more organizations
304

↓ determining, by the one or more processors, a sanctioned entity status associated with the entity based on the digital certificate and the sanctioned entity blacklist
306

↓ generating, by the one or more processors responsive to determining the sanctioned entity status associated with the entity, an error condition indicating that the digital certificate failed validation
308

FIG. 3

BLOCKCHAIN BLACKLIST ANTI-MONEY LAUNDERING SYSTEM (BBAMLS)

BACKGROUND

Business systems such as R3 Corda Enterprise and permissioned blockchain and distributed ledger technology (DLT) systems rely on PKI-based entity authentication and trust services. These systems verify signatures and perform certificate path validation from a presented certificate back to a trusted root using a chain of certificates to determine if a presented certificate associated with a signature is valid and suitable for use. Suitability may be determined through certificate path validation using information contained in the fields of each certificate in a certificate path chain, including the certificate policy, key usage, cryptographic algorithm, and certificate validity period, and the Relative Distinguished Name (RDN) components of the Subject Distinguished Name (DN) and the Issuer DN.

SUMMARY

Aspects of the present disclosure relate generally to enterprise information security, and more particularly to systems and methods for automatically checking the sanction status of an entity to determine whether the entity is prohibited from engaging in transactions with an organization.

One arrangement disclosed herein is directed to a method for automatically checking the sanction status of an entity to determine whether the entity is prohibited from engaging in transactions with an organization. In some arrangements, the method includes receiving, by one or more processors and from an entity device, a request to form an agreement between an organization associated with the one or more processors and an entity associated with the entity device, the request comprising a digital certificate. In some arrangements, the method includes maintaining, by the one or more processors and in a sanctioned entity blacklist, associations between a plurality of entities and a plurality of identifiers. In some arrangements, each identifier of the plurality of identifiers indicate that a respective entity of the plurality of entities has sanctioned entity status prohibiting the respective entity from engaging in a transaction with one or more organizations. In some arrangements, the method includes determining, by the one or more processors, a sanctioned entity status associated with the entity based on the digital certificate and the sanctioned entity blacklist. In some arrangements, the method includes generating, by the one or more processors responsive to determining the sanctioned entity status associated with the entity, an error condition indicating that the digital certificate failed validation.

In another aspect, the present disclosure is directed to a system for automatically checking the sanction status of an entity to determine whether the entity is prohibited from engaging in transactions with an organization. In some arrangements, the system includes one or more processors and one or more computer-readable storage mediums storing instructions which, when executed by the one or more processors, cause the one or more processors to receive, from an entity device, a request to form an agreement between an organization associated with the one or more processors and an entity associated with the entity device. In some arrangements, the request includes a digital certificate. In some arrangements, the system includes one or more processors and one or more computer-readable storage mediums storing instructions which, when executed by the one or more processors, cause the one or more processors to maintain, in a sanctioned entity blacklist, associations between a plurality of entities and a plurality of identifiers. In some arrangements, each identifier of the plurality of identifiers indicates that a respective entity of the plurality of entities has sanctioned entity status prohibiting the respective entity from engaging in a transaction with one or more organizations. In some arrangements, the system includes one or more processors and one or more computer-readable storage mediums storing instructions which, when executed by the one or more processors, cause the one or more processors to determine, a sanctioned entity status associated with the entity based on the digital certificate and the sanctioned entity blacklist. In some arrangements, the system includes one or more processors and one or more computer-readable storage mediums storing instructions which, when executed by the one or more processors, cause the one or more processors to generate, responsive to determining the sanctioned entity status associated with the entity, an error condition indicating that the digital certificate failed validation.

In another aspect, the present disclosure is directed to a non-transitory computer-readable storage medium storing instructions which, when executed by one or more processors, cause the one or more processors to perform operations including receiving, from an entity device, a request to form an agreement between an organization associated with the one or more processors and an entity associated with the entity device. In some arrangements, the request includes a digital certificate. In some arrangements, the non-transitory computer-readable storage medium storing instructions which, when executed by one or more processors, cause the one or more processors to perform operations further including maintaining, in a sanctioned entity blacklist, associations between a plurality of entities and a plurality of identifiers. In some arrangements, each identifier of the plurality of identifiers indicates that a respective entity of the plurality of entities has sanctioned entity status prohibiting the respective entity from engaging in a transaction with one or more organizations. In some arrangements, the non-transitory computer-readable storage medium storing instructions which, when executed by one or more processors, cause the one or more processors to perform operations further including determining, a sanctioned entity status associated with the entity based on the digital certificate and the sanctioned entity blacklist. In some arrangements, the non-transitory computer-readable storage medium storing instructions which, when executed by one or more processors, cause the one or more processors to perform operations further including generating, responsive to determining the sanctioned entity status associated with the entity, an error condition indicating that the digital certificate failed validation.

These and other features, together with the organization and manner of operation thereof, will become apparent from the following detailed description when taken in conjunction with the accompanying drawings.

BRIEF DESCRIPTION OF THE FIGURES

FIG. 3 is a flow diagram depicting a method for automatically checking the sanction status of an entity to determine whether the entity is prohibited from engaging in transactions with an organization, according to some arrangements.

Like reference numbers and designations in the various drawings indicate like elements.

DETAILED DESCRIPTION

Figure 1:
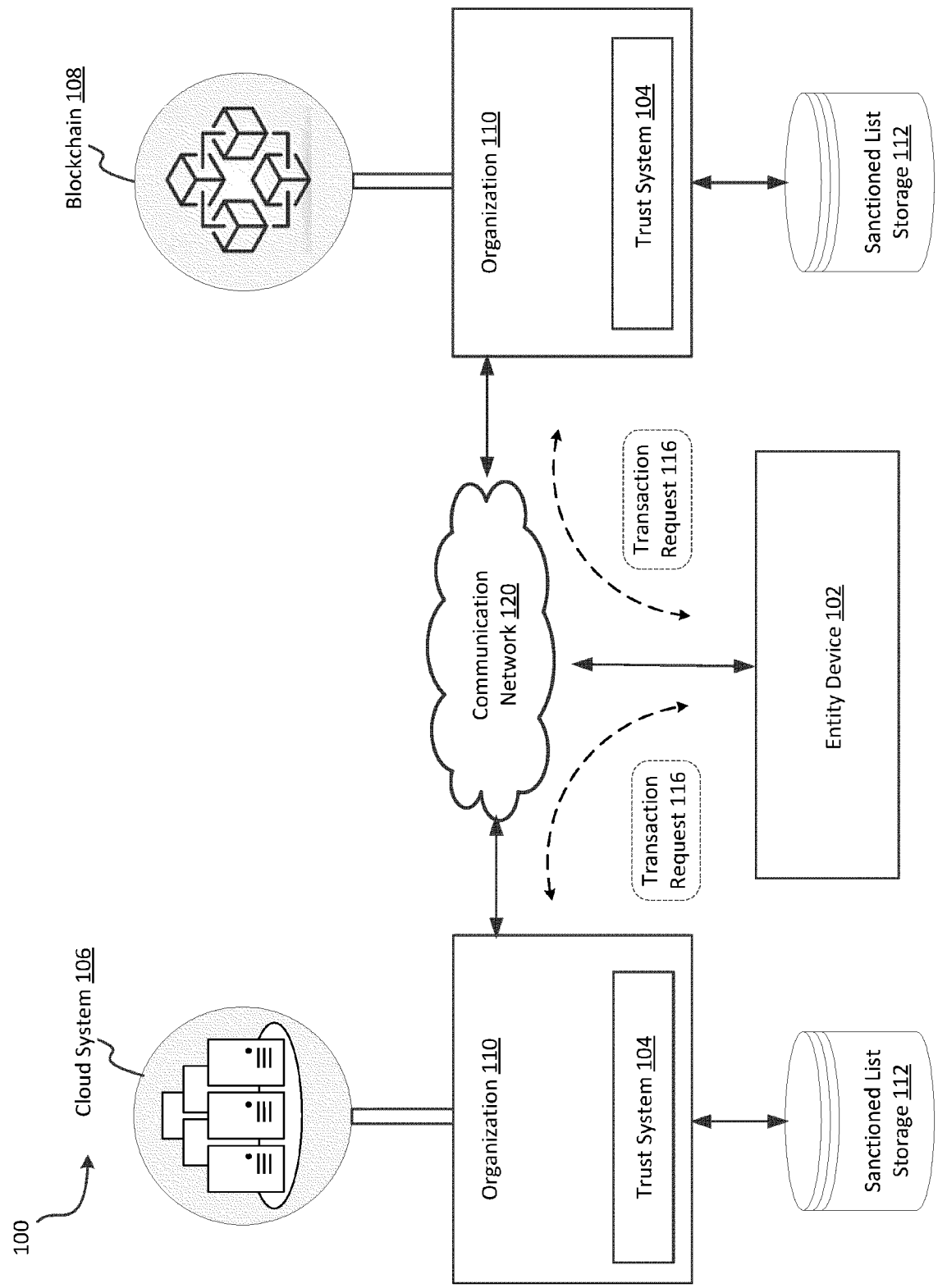
FIG. 1 is a block diagram depicting an example environment for automatically checking the sanction status of an entity to determine whether the entity is prohibited from engaging in transactions with an organization, according to some arrangements.

Traditionally, in the financial services, the parties involved in a transaction application have been introduced to each other through centralized systems using trusted third parties (TTP) that vet or authenticate these parties, such as Automated Clearing House (ACH) and Society for Worldwide Interbank Financial Telecommunication (SWIFT). These TTP provide system membership vetting and support compliance of all parties for Know-Your-Customer (KYC) industry requirements. This TTP service helps promote compliance with legal requirements such as Anti-Money Laundering (AML). Financial institution's adoption of blockchain and distributed ledger technologies (DLT) seeks to replace these centralized TTP models with distributed models having no trusted TTP.

In the case of permissionless DLT, such systems may impose no restrictions on participation at all. In the case of a permissioned DLT system, members may be unable to prohibit sanctioned parties from joining the system. In the case of either type of DLT, members may join from many countries, and their sanction status or their emergence as bad actors will be subject to change over time. These conditions may expose financial institutions (FI) to risk of violations of the United States Bank Secrecy Act (BSA) Anti-Money Laundering (AML) regulations and to reputational risk. Though an FI may not directly transact with all system members, they may still rely on them to reach consensus agreement in order to record their own transactions, and therefore their businesses may be effectively associated. Thus, there is a long-felt need in providing an ongoing, automated approach to protecting an organization against becoming involved in business activities that are legally prohibited when the organization participates in DLT activities.

Accordingly, the present disclosure is directed to systems and methods for automatically checking the sanction status of an entity to determine whether the entity is prohibited from engaging in transactions with an organization. The disclosed systems and methods may be implemented by any trust system facilitating transactions between parties, such as trust systems that rely on public key infrastructure (PKI) authentication or signatures tied to the digital certificates in a PKI, permissioned or permissionless blockchains that rely on identity certificates, and systems that rely on digital signatures. The transactions are electronic transactions for which data is generated, transmitted, or received electronically, via one or more suitable networks. The present disclosure may also be implemented as an extension to the X.509 standard defining the format for public key certificates (i.e., certificate path validation and signature verification). The present disclosure helps mitigate the legal, regulatory and reputational risks of conducting business with entities that can subject an organization to such risks by enhancing the organization's security on DLT or blockchain systems, or within the logic of a smart contract.

In general, a trust system (e.g., trust system 104 in FIG. 1) associated with an organization (e.g., organization 110 in FIG. 1) prevents transactions with sanctioned entities (e.g., an individual, a peer, a company, an organization, or a country) that should be excluded from business transactions based on their bad reputation score or the risk (e.g., legal risk, business risk, economic risk, compliance risk, reputational risk) that they pose to the organization. That is, an organization maintains a sanctioned entity blacklist such that when a computing device (e.g., entity device 102 in FIG. 1) associated with an entity attempts to form an agreement with an organization to gain access to a resource and/ or service (e.g., a cloud service, a distributed ledger technology (DLT) or blockchain, etc.) provided and/or operated by the organization, the entity's certificate (e.g., a public key certificate, a digital certificate, an identify certificate, an X.509 certificate) is validated by the trust system prior to completing the transaction and/or providing the resource and/or service to determine whether the entity is a sanctioned entity. For example, the trust system may check one or more of the components of a certificate associated with an entity (or issuer) and/or the subject names against the sanctioned entities blacklist before, during, and/or after the certificate path validation.

When used with permissioned blockchains, such components may include, for example, one or more of a geographic location (e.g., a county, a city, a state, a country), a relative distinguished name, a distinguished name, an organization, and/or an organization unit. When used with permissionless blockchains (e.g., a public blockchain) in which the entity seeking to gain access may be anonymous, the trust system may check a keyIdentifier and/or a publicKey component. If the trust system determines that the certificate includes one or more components on the sanctioned entity blacklist, then the trust system may set a path validation error to bar access to the requested service and/or send error messages to appropriate members of the organization. The trust system may perform the check at entity enrollment and/or at subsequent times (e.g., periodically, randomly, every time, etc.) that the entity attempts to gain access to the cloud service and/or blockchain. In some arrangements, prior to the execution of a smart contract (e.g., a self-executing contract, a blockchain contract, a digital contract), a trust system associated with the organization may compare the certificate components of the entity (also referred to herein as "a peer") to a sanctioned entity blacklist maintained by the trust system. In response to determining that the entity associated with the smart contract is on the sanctioned entity blacklist, the trust system identifies (e.g., labels, categorizes, groups) the entity as a sanctioned entity and prevents the execution of the smart contract.

FIG. 1 is a block diagram depicting an example environment 100 for automatically checking the sanction status of an entity to determine whether the entity is prohibited from engaging in transactions with an organization, according to some arrangements. The environment 100 includes an entity device 102 in communication with an organization 110 via a communication network 120. The organization includes a trust system 104 for checking the sanctioned status of an entity associated with the entity device 102. The environment 100 also includes a cloud system 106 in communication with organization 110, such that the organization 110 may be a cloud service customer (CSC) or a cloud service provider (CSP) of resources and/or services associated with cloud system 106. The environment 100 also includes a blockchain 108 in communication with organization 110, such that the organization 110 may be a DLT vendor or a DLT provider of resources and/or services associated with blockchain 108. The entity device 102, the trust system 104, the cloud system 106, and the blockchain 108 may each include hardware elements, such as one or more processors, logic devices, or circuits.

The environment 100 includes a sanctioned list storage 112 for storing a sanctioned entity blacklist containing associations (e.g., linkages, relationships, connections) between a plurality of entities and a plurality of identifiers. Each identifier of the plurality of identifiers indicates that a respective entity of the plurality of entities has sanctioned entity status prohibiting the respective entity from engaging in a transaction with one or more organizations. The sanctioned list storage 112 may be communicably coupled to the trust system 104 of organization 110 via the communication network 120. In some arrangements, the sanctioned list storage 112 may function as a local storage such that the sanctioned list storage 112 may only be accessible by the trust system 104 of organization 110. In some arrangements, the sanctioned list storage 112 may be communicably coupled to a network (e.g., a cluster) of computing devices and/or data storages associated with other organizations (not shown in FIG. 1). In this configuration, the sanctioned list storage 112 may function as a system storage allowing any computing device and/or data storage device associated with the other organizations to directly or indirectly access the contents of sanctioned list storage 112.

An entity device 102 may be an electronic device that is under the control of an entity (or a user associated with an entity) and may be capable of receiving and/or sending a transaction request 116 to/from one or more entity devices 102 and/or one or more trust systems 104 over the communication network 120. An entity device 102 may be any number of different types of electronic devices adapted to communicate over a communication network 120, including without limitation, a personal computer, a laptop computer, a desktop computer, a mobile computer, a tablet computer, a smart phone, a digital video recorder, a set - top box for a television, a video game console, or any other type and form of computing device or combinations of devices. In some arrangements, the type of entity device 102 may be categorized as a mobile device, a desktop device, a device intended to remain stationary, a device adapted to primarily access a network via a local area network (e.g., communication network 120), or another category of electronic devices such as a media consumption device. The entity device 102 may include a user application (e.g., a web browser) to facilitate the sending and receiving of data over communication network 120.

The trust system 104 may be an electronic device that is capable of receiving and/or sending a transaction request 116 to/from one or more entity devices 102 and/or one or more trust systems 104 over communication network 120. A trust system 104 may be any number of different types of electronic devices adapted to communicate over a communication network 120, including without limitation, an application server, a catalog server, a communications server, a computing server, a database server, a file server, a game server, a mail server, a media server, a proxy server, a virtual server, a web server, or any other type and form of computing device or combinations of devices.

A transaction request 116 that an entity device 102 associated with an entity sends to a trust system 104 associated with the organization 110 may be a request to form an agreement (e.g., or to enroll the entity into a membership) between the entity and the organization 110. The agreement may include terms indicating that the organization 110 is to provide resources and/or services to the entity, such as those associated with blockchain 108 and/or cloud system 106. In some arrangements, the transaction request 116 that an entity device 102 sends to a trust system 104 may be a request to gain access to resources and/or services provided by the organization 110 that the parties already agreed upon per the terms of an agreement previously formed and/or executed. In some arrangements, a transaction request 116 may include a certificate (e.g., a public key certificate, a digital certificate, an identify certificate) associated with the entity and/or entity device 102.

A transaction request 116 that a trust system 104 associated with the organization 110 sends to an entity device 102 associated with an entity may be a request to form an agreement (e.g., or to enroll the entity into a membership) between the entity and the organization 110. The agreement may include terms indicating that the organization 110 is to provide resources and/or services to the entity, such as those associated with blockchain 108 and/or cloud system 106. In some arrangements, the transaction request 116 that a trust system 104 sends to an entity device 102 may be a request to provide resources and/or services to the entity device 102. For example, the parties may have previously formed an agreement (e.g., a smart contract) where the terms indicated that if certain conditions were met that the organization 110 would provide such resources and/or services to the entity device 102. Upon determining that the terms have been satisfied, the trust system 104 may send a request to the entity device 102 requesting to provide the identified resources and/or services to the entity device 102. In some arrangements, a transaction request 116 may include a certificate (e.g., a public key certificate, a digital certificate, an identify certificate) associated with the organization 110 and/or trust system 104.

The communication network 120, (e.g., a local area network (LAN), wide area network (WAN), the Internet, or a combination of these or other networks) connects any electronic device (e.g., entity device 102, trust system 104, etc.) with one or more electronic devices and/or databases (e.g., sanctioned list storage 112). The environment 100 may include many thousands of entity devices 102 and trust systems 104 interconnected in any arrangement to facilitate the exchange of data between the electronic devices.

Although not illustrated, in many arrangements, the communication network 120 may comprise one or more intermediary devices, including gateways, routers, firewalls, switches, network accelerators, Wi-Fi access points or hotspots, or other devices. Any of the electronic devices and/or the communication network 120 may be configured to support any application layer protocol, including without limitation, Transport Layer Security (TLS), Secure Socket Layer (SSL), Hypertext Transfer Protocol (HTTP), and Hypertext Transfer Protocol Secure (HTTPS).

As discussed above, an organization 110 may be a DLT vendor, DLT provider, a Cloud Service Provider (CSP), and/or a customer of a CSP. The organization 110, or a trust system 104 associated with the organization 110, maintains a sanctioned entity blacklist in a database (e.g., sanctioned list storage 112) that a trust system 104 may use to compare with an entity (e.g., an entity associated with an entity device 102) that the organization wishes to conduct business with to determine if the entity is a sanctioned entity. A sanctioned entity, as used herein, refers to an individual, company, organization, or country that for any reason, including Anti-Money Laundering (AML) risk or legal prohibition should be excluded from business practice.

In some arrangements, there may be a local blacklist maintained by a customer (e.g., organization 110). For example, a local blacklist only allows members of the organization 110 and/or trust systems 104 associated with the organization 110 to access the sanctioned list storage 112 that is managed and/or controlled by the organization 110. That is, the trust system 104 associated with organization 110 prevents other organizations (not shown in FIG. 1) from accessing the sanctioned list storage 112 by denying any requests for access.

In some arrangements, there may be a system blacklist maintained by a customer (e.g., organization 110). For example, a system blacklist allows other organizations (not shown in FIG. 1) to access the sanctioned list storage 112 that is managed and/or controlled by organization 110. As such, the organizations having access to the same sanctioned list storage 112 may each learn (e.g., be notified, be alerted) when an entity has been removed from or added to the sanctioned entity blacklist.

In some arrangements, an application executing on a computing device may provide a call back function to allow a user to validate the path validation certificate set against their local blacklist.

Prior to, following, and/or during the certificate path validation, trust system 104 may check one or more components against a sanctioned entities blacklist. A component may include the Country (C) Relative Distinguished Name (RDN) components of the Issuer (e.g., an entity) and the Subject Distinguished Names (DN). If a certificate contains a Country RDN that appears on the sanctioned entities blacklist, then the trust system 104 may raise (e.g., generate, produce, cause, set) a path validation error condition. For example, an ASN.1 schema (e.g., SanctionedEntitiesBlacklist, as described herein) may include an alert email mechanism allowing a validator tool (e.g., an application executing on trust system 104 and/or entity device 102) to send a notification (e.g., email, etc.) to a user associated with an entity and/or an organization 110. As another example, a validation tool may perform a machine learning and/or a fuzzy search. In response to not finding an exact match to the search string, the validator tool may raise a flag indicating to a computing device and/or a user associated with the computing device that the entity may be suspicious. In some arrangements, responsive to detecting the path validation error condition, a trust system 104 may log the details of the membership detection event in an event journal or a secure event journal. In some arrangements, responsive to detecting the path validation error condition, the trust system 104 may store the event journal or secure event journal in a database (e.g., sanctioned list storage 112).

A secure event journal may be a journal that is digitally signed by an application (e.g., a logging program, a cloud application, a block chain application, trust system application 270A in FIG. 1, etc.) that has a certificate making the journal tamper-resistant. In some arrangements, a secure journal may be a journal that is made secure by controlled access, backups, audits, and/or a monitoring alert system that prevents undetected alteration (e.g., modification, destruction, deleting, etc.) of the journal. For example, the journal may be signed with a private key such that adding or deleting a record to the journal causes the journal to be invalidated. In some arrangements, the secure journal may be maintained on a cloud system (e.g., cloud system 106 in FIG. 1) and/or a block chain (e.g., blockchain 108 in FIG. 1).

In some arrangements, responsive to detecting the path validation error condition, the trust system 104 may generate and send a message (or a secure message) to appropriate parties in the organization 110 indicating a potential violation (e.g., legal, ethical), such as a violation of BSA/AML. For example, responsive to detecting that the entity is associated with a blacklisted Country, the trust system 104 may raise (e.g., generate, produce, cause, set) an error condition indicating that the certificate has failed validation and that it is not suitable for use. In some arrangements, the trust system 104 may search other RDN components, such as an organization (O) and organization unit (OU) names.

Example Abstract Syntax Notation One (ASN.1) schema for a Sanctioned Countries blacklist may be as follows:

| EXAMPLE ASN.1 SCHEMA |
| --- |
| SanctionedEntitiesBlacklist ::= SEQUENCE SIZE(1..MAX) OF Blacklisted<br>Blacklisted ::= SEQUENCE {<br>    countryCode  Directory  String  OPTIONAL,<br>    alert  EmailAddress  OPTIONAL,<br>    phone  TelephoneNumber  OPTIONAL,<br>    address  Address  OPTIONAL,<br>    keyIdentifier  SubjectPublicKeyInfo  OPTIONAL,<br>    publicKey  BIT  STRING  OPTIONAL<br>} |

The trust system 104 may use a sanctioned entity blacklist to provide assurance that an entity associated with the entity device 102 requesting (or attempting) to enroll in a DLT or other system using PKI to authenticate their identity is not on the sanctioned entity blacklist. The trust system 104 may perform this membership test at enrollment and/or at each subsequent attempt of the entity to gain access to the system by authenticating their identity. By extending the check to subsequent attempts, the trust system 104 may catch (e.g., detect, determine) changes in membership status for a given entity.

In some arrangements, a permissioned DLT and/or a trust system 104 associated with the permissioned DLT may maintain sanctioned entity for its members, adding newly sanctioned entities to the list as needed over time. Such a list could be checked by DLT participants each time signature verification and certificate path testing were performed by a participant (or trust system 104) to allow a transaction flow to be terminated. In the case of a smart contract, legal language and programming language code could be added to the contract to force the agreement to be nullified and not executed on detection by the smart contract of a party to the contract becoming a member of the sanctioned entity blacklist.

In some arrangements, the trust system 104 may determine if the entity appears on the sanctioned entity blacklist based on one or more of the components (as discussed herein). In some arrangements, in the case of a permissionless or public blockchain, the trust system 104 may determine if the entity appears on the sanctioned entity blacklist based on a keyIdentifier and/or a publicKey. Relying on the keyIdentifier and/or publicKey instead of the other components discussed herein would allow the trust system 104 to vet pseudo-anonymous transactions. In some arrangements, relying on the keyIdentifier and/or publicKey instead of the other components may make detecting sanctioned entities less efficient, but not impossible.

In some arrangements, the trust system 104 may use exact string matching of search terms to locate sanctioned entities in the sanctioned entity blacklist. For example, the trust system 104 may compare each sanctioned entity term to one or more fields in a presented X.509 certificate. In some arrangements, the trust system 104 may perform a search of an entire certificate for each sanctioned entity term. In some arrangements, the trust system 104 may use approximate string matching (also referred to herein as, "fuzzy string searching").

In some arrangements, the trust system 104 may produce a list of terms that approximate the sanctioned entity term. In some arrangements, human intervention may be used to augment or follow machine learning or artificial intelligence techniques to determine whether a match succeeded by examining the list of candidate matches found by a fuzzy search. The trust system 104 may log the information gathered by the machine learning or artificial intelligence into a database (e.g., sanctioned list storage 112) to provide evidence of active implementation of controls that may be audited by regulators, law enforcement, or others.

Figure 2B:
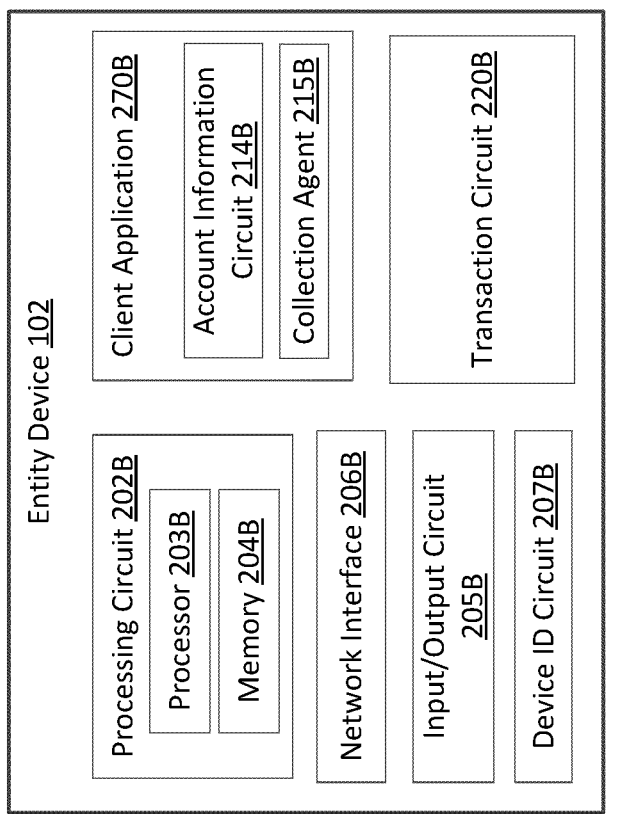
FIG. 2B is a block diagram depicting an example entity device of the environment in FIG. 1, according to some arrangements.
Figure 2A:
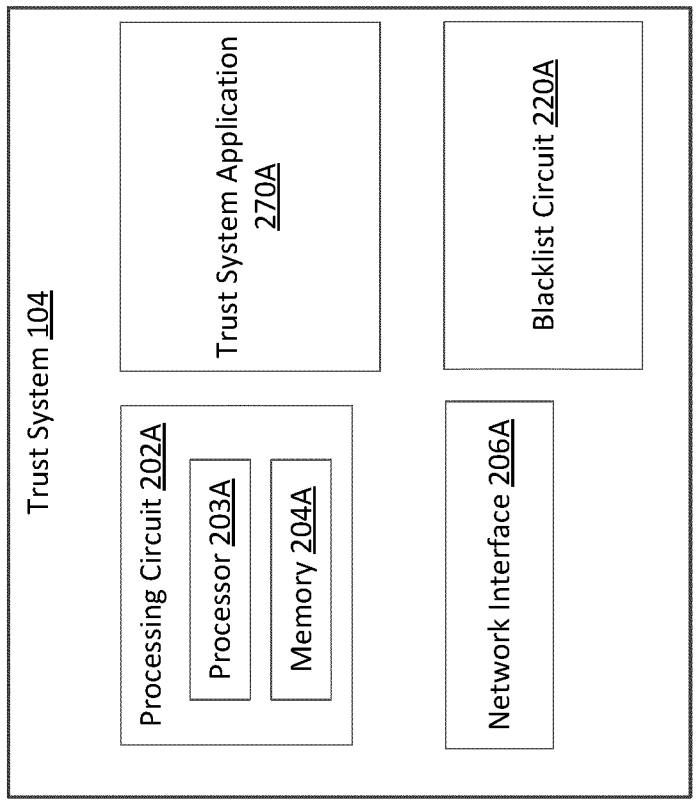
FIG. 2A is a block diagram depicting an example trust system of the environment in FIG. 1, according to some arrangements.

FIG. 2A is a block diagram depicting an example trust system 104 of the environment in FIG. 1, according to some arrangements. While various circuits, interfaces, and logic with particular functionality are shown, it should be understood that the trust system 104 includes any number of circuits, interfaces, and logic for facilitating the functions described herein. For example, the activities of multiple circuits may be combined as a single circuit and implemented on a same processing circuit (e.g., processing circuit 202A), as additional circuits with additional functionality are included.

The trust system 104 includes a processing circuit 202A composed of one or more processors 203A and a memory device 204A. A processor 203A may be implemented as a general-purpose processor, a microprocessor, an Application Specific Integrated Circuit (ASIC), one or more Field Programmable Gate Arrays (FPGAs), a Digital Signal Processor (DSP), a group of processing components, or other suitable electronic processing components. In many arrangements, processor 203A may be a multi-core processor or an array (e.g., one or more) of processors.

The memory 204A (e.g., Random Access Memory (RAM), Read-Only Memory (ROM), Non-volatile RAM (NVRAM), Flash Memory, hard disk storage, optical media, etc.) of processing circuit 202A stores data and/or computer instructions/code for facilitating at least some of the various processes described herein. The memory 204A includes tangible, non-transient volatile memory, or non-volatile memory. The memory 204A stores programming logic (e.g., instructions/code) that, when executed by the processor 203A, controls the operations of the trust system 104. In some arrangements, the processor 203A and the memory 204A form various processing circuits described with respect to the trust system 104. The instructions include code from any suitable computer programming language such as, but not limited to, C, C++, C#, Java, JavaScript, VBScript, Perl, HTML, XML, Python, TCL, and Basic. In some arrangements, the trust system 104 may include an input/output circuit (not shown) for receiving/providing user input from/to a computing device (e.g., entity device 102 and/or another trust system 104). In some arrangements (referred to as "headless servers"), the trust system 104 may omit the input/output circuit, but may communicate with a computing device (e.g., entity device 102 and/or another trust system 104) via network interface 206A.

The trust system 104 includes a network interface 206A configured to establish a communication session with a computing device (e.g., entity device 102 and/or another trust system 104) for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In many arrangements, the trust system 104 may include a plurality of network interfaces 206A of different types, allowing for connections to a variety of networks, such as local area networks or wide area networks including the Internet, via different subnetworks.

The trust system 104 includes a blacklist circuit 220A that may be configured to receive from entity device 102, via communication network 120, a transaction request 116 to form an agreement between organization 110 and an entity associated with the entity device 102. In some arrangements, the transaction request 116 may be a request to gain access to resources and/or services provided by the organization 110 that the parties already agreed upon per the terms of an agreement previously formed and/or executed. In some arrangements, a transaction request 116 may include a certificate (e.g., a public key certificate, a digital certificate, an identify certificate) associated with the entity and/or entity device 102. In some arrangements, the agreement may indicate that the organization agrees to provide or will provide services and/or resources associated with at least one of a cloud service (e.g., cloud system 106) and a blockchain (e.g., blockchain 108).

The blacklist circuit 220A may be configured to send to entity device 102, via communication network 120, a transaction request 116 to form an agreement (e.g., or to enroll the entity into a membership) between organization 110 and an entity associated with the entity device 102. The blacklist circuit 220A may generate an agreement that includes terms indicating that the organization 110 is to provide resources and/or services to the entity, such as those associated with blockchain 108 and/or cloud system 106. The transaction request 116 that the blacklist circuit 220A sends to the entity device 102 may include a certificate (e.g., a public key certificate, a digital certificate, an identify certificate) associated with the organization 110 and/or trust system 104.

The blacklist circuit 220A may be configured to maintain in a sanctioned entity blacklist associations between a plurality of entities and a plurality of identifiers. Each identifier of the plurality of identifiers may indicate that a respective entity of the plurality of entities has sanctioned entity status prohibiting the respective entity from engaging in a transaction with one or more organizations. The blacklist circuit 220A may store the sanctioned entity blacklist in any data structure format, such as an array, a list, a linked list, a record, a union, a tagged union, a class, a tree, and a queue. The blacklist circuit 220A may store the sanctioned entity blacklist in any memory or database (e.g., sanctioned list storage 112).

The blacklist circuit 220A may be configured to determine a sanctioned entity status associated with the entity based on the digital certificate and the sanctioned entity blacklist. In some arrangements, the blacklist circuit 220A determines a sanctioned entity status associated with the entity by providing a call-back function to an application (e.g., trust system application 270A) executing on a computing device associated with organization 110 and/or an application (e.g., client application 270B) executing on a computing device (e.g., entity device 102) associated with an entity. The blacklist circuit 220A may then receive an indication that a user of the computing device determined the sanctioned entity status associated with the entity based on the call-back function.

In some arrangements, the blacklist circuit 220A determines a sanctioned entity status associated with the entity by searching the digital certificate for at least one entity of the plurality of entities contained in the sanctioned entity blacklist. In some arrangements, the blacklist circuit 220A uses an extract string search or an approximate string search to locate sanctioned entities in the sanctioned entity blacklist.

In some arrangements, the blacklist circuit 220A determines a sanctioned entity status associated with the entity by comparing one or more components of the digital certificate to the sanctioned entity blacklist. The blacklist circuit 220A determines an occurrence of the one or more components in the sanctioned entity blacklist. In some arrangements, the one or more components of the digital certificate may include at least one of a name of the entity, an organization associated with the entity, and a geographic location associated with the entity. In some arrangements, the blacklist circuit 220A may determine that the agreement indicates that the organization 110 is a provider or a vendor of services associated with a permissionless blockchain. Responsive to the determination, the blacklist circuit 220A may extract one or more components from the digital certificate, such as a KeyIdentifier associated with the entity and a publicKey associated with the entity.

The blacklist circuit 220A may be configured to determine that a certificate path associated with the entity device 102 is valid by performing a certificate path validation based on the digital certificate associated with the entity and/or entity device 102. In some arrangements, the blacklist circuit 220A performs the certificate path validation prior to determining the sanctioned entity status associated with the entity and/or entity device 102. In some arrangements, the blacklist circuit 220A performs the certificate path validation during (simultaneously, substantially simultaneously, concurrently, in-parallel, or substantially in-parallel) to determining the sanctioned entity status associated with the entity and/or entity device 102.

The blacklist circuit 220A may be configured to generate, responsive to determining the sanctioned entity status associated with the entity, an error condition indicating that the digital certificate failed validation.

The blacklist circuit 220A may be configured to send responsive to the generation of the error condition a message to one or more members of the organization indicating that the entity requesting to form the agreement with the organization has sanctioned entity status. In some arrangements, the message may be a secure message using any secure messaging protocol, such as Secure/Multipurpose Internal Mail Extensions (S/MIME), Pretty Good Privacy (PGP), or transport layer security (TLS).

The blacklist circuit 220A may be configured to store, responsive to the generation of the error condition, the error condition in an event journal. The blacklist circuit 220A may store the event journaling a data storage (e.g., sanctioned list storage 112).

The blacklist circuit 220A may be configured to deny, responsive to generating the error condition, the request to form the agreement between the organization associated with the trust system 104 and the entity associated with the entity device 102.

The blacklist circuit 220A may be configured to generate a smart contract indicating a service agreement between the organization associated with the trust system 104 and a second entity associated with a second entity device. The smart contract may include programming language code that when executed nullifies the smart contract. For example, the smart contract may receive an indication (or may determine itself) that the second entity has become a member of the sanctioned entity blacklist. In response, the programming language code may execute and nullify the smart contract; thereby terminating the ability for the entity and/or the entity device 102 to receive resources and/or services (as described in the terms of the contract) from the organization 110, the cloud system 106, and/or the blockchain 108.

The blacklist circuit 220A may be configured to receive a message indicating that a second entity has been assigned sanctioned entity status. Responsive to receiving the message, the blacklist circuit 220A may terminate access by a second entity to resources and/or services provided by the organization 110, the cloud system 106, and/or the blockchain 108.

The trust system 104 includes (or executes) a trust system application 270A that is communicably coupled to cloud system 106 and/or blockchain 108. The trust system application 270A allows the trust system 104 to provide resources and/or services associated with cloud system 106 and/or blockchain 108 to entity device 102. In some arrangements, the resources and/or services of cloud system 106 and/or blockchain 108 pass through the trust system application 270A to entity device 102. In some arrangements, the trust system application 270A grants entity device 102 access (permission) to bypass the trust system application 270A to directly receive the resources and/or services provided by the cloud system 106 and/or blockchain 108. The trust system application 270A may be an internet/web browser, a graphic user interface (GUI), an email reader/client, a File Transfer Protocol (FTP) client, a virtual machine application, or a banking client application independent from an internet/web browser.

The trust system 104 may include a bus (not shown), such as an address/data bus or other communication mechanism for communicating information, which interconnects subsystems and devices, such as the network interface 206A, the blacklist circuit 220A, or any other subsystem and device of the trust system 104. In some arrangements, the trust system 104 may include one or more of any such components.

In some arrangements, some or all of the circuits of the trust system 104 may be implemented with the processing circuit 202A. For example, the network interface 206A and the blacklist circuit 220A may be implemented as a software application stored within the memory 204A and executed by the processor 203A. Accordingly, such arrangement can be implemented with minimal or no additional hardware costs. In some arrangements, any of these above-recited circuits rely on dedicated hardware specifically configured for performing operations of the circuit.

FIG. 2B is a block diagram depicting an example entity device of the environment in FIG. 1, according to some arrangements. A user and/or an entity operates or is associated with the entity device 102. While various circuits, interfaces, and logic with particular functionality are shown, it should be understood that the entity device 102 includes any number of circuits, interfaces, and logic for facilitating the functions described herein. For example, the activities of multiple circuits are combined as a single circuit and implemented on a same processing circuit (e.g., processing circuit 202B), as additional circuits with additional functionality are included.

In some arrangements, the entity device 102 includes a processing circuit 202B having a processor 203B and memory 204B. The processor 203B is implemented as a general-purpose processor, a microprocessor, an ASIC, one or more FPGAs, a DSP, a group of processing components that are distributed over various geographic locations or housed in a single location or device, or other suitable electronic processing components. In many arrangements, processor 203B may be a multi-core processor or an array (e.g., one or more) of processors.

The memory 204B (e.g., RAM, NVRAM, ROM, Flash Memory, hard disk storage, etc.) stores data and/or computer instructions/code for facilitating the various processes described herein. Moreover, the memory 204B is or includes tangible, non-transient volatile memory or non-volatile memory. Accordingly, the memory 204B includes database components, object code components, script components, or any other type of information structure for supporting the various activities and information structures described herein. The instructions include code from any suitable computer programming language such as, but not limited to, C, C++, C#, Java, JavaScript, VBScript, Perl, HTML, XML, Python, TCL, and Basic.

The entity device 102 includes a network interface 206B configured to establish a communication session with a computing device (e.g., a trust system 104 and/or another entity device 102) for sending and receiving data over the communication network 120 to the computing device. Accordingly, the network interface 206B is an interface such as, but not limited to, the network interface 206A in FIG. 2A.

The entity device 102 includes an input/output circuit 205B configured to receive user input from and provide information to a user. In this regard, the input/output circuit 205B is structured to exchange data, communications, instructions, etc. with an input/output component of the entity device 102. Accordingly, input/output circuit 205B may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of entity device 102, such as a built-in display, touch screen, microphone, etc., or external to the housing of entity device 102, such as a monitor connected to entity device 102, a speaker connected to entity device 102, etc., according to various arrangements. In some arrangements, the input/output circuit 205B includes communication circuitry for facilitating the exchange of data, values, messages, and the like between the input/output device and the components of the entity device 102. In some arrangements, the input/output circuit 205B includes machine-readable media for facilitating the exchange of information between the input/output device and the components of the entity device 102. In still another arrangement, the input/output circuit 205B includes any combination of hardware components (e.g., a touchscreen), communication circuitry, and machine-readable media.

The entity device 102 includes a device identification circuit 207B (shown in FIG. 2B as device ID circuit 207B) configured to generate and/or manage a device identifier associated with entity device 102. The device identifier may include any type and form of identification used to distinguish the entity device 102 from other entity devices 102. In some arrangements, a device identifier may be associated with one or more other device identifiers. In some arrangements, to preserve privacy, the device identifier may be cryptographically generated, encrypted, or otherwise obfuscated by any circuit (e.g., processing circuit 202B, device identification circuit 207B, etc.) of entity device 102. In some arrangements, the entity device 102 may include the device identifier in a transaction request (e.g., transaction request 116) that the entity device 102 sends to a trust system 104 and/or another entity device 102.

The entity device 102 includes a transaction circuit 220B that may be configured to generate and send, via communication network 120, a transaction request 116 to trust system 104 requesting to form an agreement between the organization 110 associated with the trust system 104 and an entity associated with the entity device 102. In some arrangements, the entity device 102 may be configured to send a transaction request 116 to trust system 104 requesting access to resources and/or services provided by the organization 110 that the parties already agreed upon per the terms of an agreement previously formed and/or executed. In some arrangements, the entity device 102 may be configured to generate a transaction request 116 that includes a certificate (e.g., a public key certificate, a digital certificate, an identify certificate) associated with the entity and/or the entity device 102. In some arrangements, the transaction request 116 may cause the trust system 104 to perform a certificate path validation and/or a check of the sanctioned entity status associated with the entity and/or entity device 102.

The transaction circuit 220B may be configured to receive a call-back function associated with the organization from the trust system 104. In response to receiving the call-back-function, the transaction circuit 220B may present information associated with the call-back function on a display controlled by or associated with the entity device 102. The transaction circuit 220B may be configured to receive from a user operating the entity device 102 an indication that the user determined the sanctioned entity status associated with the entity based on the call-back function. The transaction circuit 220B may send, via the communication network 120, the indication to the trust system 104.

The transaction circuit 220B may be configured to receive a message from the trust system 104 indicating that the trust system 104 has denied the request to form an agreement and/or access to resources and/or services provided by the trust system 104, the cloud system 106, and/or the blockchain 108. In some arrangements, the message may indicate that the trust system 104 has determined that the entity and/or the entity device 102 has been assigned sanctioned entity status.

The entity device 102 includes (or executes) a client application 270B that is communicably coupled to the trust system 104 via the communication network 120 and configured to access resources and/or services provided by the trust system 104. The client application 270B may be communicably coupled to the cloud system 106 and/or blockchain 108 via the communication network 120 and configured to access resources and/or services provided by the cloud system 106 and/or blockchain 108 upon receiving permission from the trust system 104. For example, a trust system 104 may provide such permission after determining that the entity is not on the sanctioned entity blacklist. Accordingly, the client application 270B may be configured to send/receive data between the computing devices (e.g., the entity device 102, the trust system 104, the cloud system 106, and the blockchain 108), and display within the client application 270B the data that is indicative of the resources and/or services, as discussed herein. The client application 270B may be an internet/web browser, a graphic user interface (GUI), an email reader/client, a File Transfer Protocol (FTP) client, a virtual machine application, or a banking client application independent from an internet/web browser.

The client application 270B includes a collection agent 215B. Collection agent 215B may include an application plug-in, application extension, subroutine, browser toolbar, daemon, or other executable logic for collecting data processed by client application 270B and/or monitoring interactions of user with the input/output circuit 205B. In other arrangements, collection agent 215B may be a separate application, service, daemon, routine, or other executable logic separate from client application 270B but configured for intercepting and/or collecting data processed by client application 270B, such as a screen scraper, packet interceptor, application programming interface (API) hooking process, or other such application. The collection agent 215B is configured for intercepting or receiving data input via input/output circuit 205B, including mouse clicks, scroll wheel movements, gestures such as swipes, pinches, or touches, or any other such interactions; as well as data received and processed by client application 270B. The collection agent 215B, may begin intercepting/gathering/receiving data input via its respective input/output circuit based on any triggering event, including, e.g., a power-up of entity device 102 or a launch of any software application executing on a processor of entity device 102.

The entity device 102 includes a bus (not shown), such as an address/data bus or other communication mechanism for communicating information, which interconnects subsystems and devices, such as processing circuit 202B, processor 203B, memory 204B, network interface 206B, input/output circuit 205B, device ID circuit 207B, client application 270B, transaction circuit 220B, or any other subsystem and device of the entity device 102. In some arrangements, the entity device 102 may include one or more of any such components.

In some arrangements, some or all of the circuits of the entity device 102 may be implemented with the processing circuit 202B. For example, the subsystems and devices of entity device 102 may be implemented as a software application stored within the memory 204B and executed by the processor 203B. Accordingly, such arrangement can be implemented with minimal or no additional hardware costs. In some arrangements, any of these above-recited circuits rely on dedicated hardware specifically configured for performing operations of the circuit.

FIG. 3 is a flow diagram depicting a method for automatically checking the sanction status of an entity to determine whether the entity is prohibited from engaging in transactions with an organization, according to some arrangements. Additional, fewer, or different operations may be performed in the method. In some arrangements, some or all operations of method 300 may be performed by one or more processors executing on one or more computing devices, systems, or servers. In some arrangements, method 300 may be performed by one or more trust systems, such as one or more trust systems 104 in FIG. 1. In some arrangements, some or all operations of method 300 may be performed by one or more entity devices, such as one or more entity devices 102 in FIG. 1. Each operation may be re-ordered, added, removed, or repeated.

As shown in FIG. 3, the method 300 includes the operation 302 of receiving, by one or more processors and from an entity device, a request to form an agreement between an organization associated with the one or more processors and an entity associated with the entity device, the request comprising a digital certificate. The method also includes the operation 304 of maintaining, by the one or more processors and in a sanctioned entity blacklist, associations between a plurality of entities and a plurality of identifiers. In some arrangements, each identifier of the plurality of identifiers indicating that a respective entity of the plurality of entities has sanctioned entity status prohibiting the respective entity from engaging in a transaction with one or more organizations. The method also includes the operation 306 of determining, by the one or more processors, a sanctioned entity status associated with the entity based on the digital certificate and the sanctioned entity blacklist. The method also includes the operation 308 of generating, by the one or more processors responsive to determining the sanctioned entity status associated with the entity, an error condition indicating that the digital certificate failed validation.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method comprising:
receiving, by one or more processors and from an entity device associated with an entity, a request to execute a transaction between a blockchain of a computing system corresponding to an organization associated with the one or more processors and the entity device;
extracting by the one or more processors and from a digital certificate in response to a determination that the blockchain is restricted to predetermined members, a component including a first entity identifier identifying the entity device;
extracting, by the one or more processors and from the digital certificate in response to a determination that the blockchain is compatible with a request from an anonymous entity device, the component including the first key identifier and a first public key;
maintaining, by the one or more processors and in a sanctioned list storage, a sanctioned entity blacklist having one or second key identifiers, second entity identifiers and second public keys each indicating that a respective entity has a sanctioned entity status prohibiting the respective entity from performing a transaction with the blockchain of the computing system;
authenticating, by the one or more processors, the entity device to the blockchain by identifying one or more of a first match between the first key identifier and one of the second key identifiers, a second match between the first public key and one of the second public keys, and a third match between the first entity identifier and one or more the second entity identifiers;

generating, by the one or more processors responsive to one or more of the first match, the second match and the third match, an error condition indicating that the digital certificate failed validation;

blocking, by the one or more processors responsive to the generating the error condition, the transaction between the entity device and the blockchain of the computing system, system; and inserting, by the one or more processors into a smart contract linked to the entity device responsive to the generating the error condition, code to prevent execution of the smart contract.

2. The method of claim 1, wherein the smart contract corresponds to an agreement that indicates that the organization agrees to provide resources associated with at least one of a cloud service and a blockchain.

3. The method of claim 1, wherein the sanctioned entity blacklist is a system-wide sanctioned entity blacklist accessible by a second organization.

4. The method of claim 1, wherein determining a sanctioned entity status associated with the entity comprising:
   providing, by the one or more processors, a call-back function to an application executing on a computing device associated with the organization; and
   receiving, by the one or more processors, an indication that a user of the computing device determined the sanctioned entity status associated with the entity based on the call-back function.

5. The method of claim 1, further comprising:
   determining, by the one or more processors, that a certificate path associated with the entity device is valid by performing a certificate path validation based on the digital certificate.

6. The method of claim 5, wherein the one or more processors performs the certificate path validation prior to determining the sanctioned entity status associated with the entity.

7. The method of claim 1, wherein determining the sanctioned entity status associated with the entity comprising:
   searching, by the one or more processors and in the sanctioned entity blacklist, the digital certificate for at least one entity of the plurality of entities using an extract string search or an approximate string search.

8. The method of claim 1, wherein determining the sanctioned entity status associated with the entity comprising:
   comparing, by the one or more processors, one or more components of the digital certificate to the sanctioned entity blacklist; and
   determining, by the one or more processors, an occurrence of the one or more components in the sanctioned entity blacklist.

9. The method of claim 8, wherein the one or more components of the digital certificate comprising at least one of a name of the entity, an organization associated with the entity, and a geographic location associated with the entity.

10. The method of claim 8, wherein the smart contract that corresponds to an agreement that indicates that the organization is a provider or a vender of services associated with a permissionless blockchain, and wherein the one or more components of the digital certificate comprises at least one of the first key identifier and the first public key.

11. The method of claim 1, further comprising:

sending, by the one or more processors responsive to the generation of the error condition, a message to one or more members of the organization indicating that the entity requesting to execute the connection corresponding to the organization has sanctioned entity status.

12. The method of claim 1, further comprising:
storing, by the one or more processors responsive to the generation of the error condition, the error condition in an event journal.

13. The method of claim 1, further comprising:
denying, by the one or more processors responsive to generating the error condition, the request to execute the connection corresponding to the organization associated with the one or more processors and the entity associated with the entity device.

14. The method of claim 1, further comprising:
determining, by the smart contract, that the entity is a member of the sanctioned entity blacklist.

15. The method of claim 1, further comprising:
receiving, by the one or more processors, a message indicating that a second entity has been assigned sanctioned entity status; and
terminating, by the one or more processors responsive to receiving the message, access by the second entity to a service provided by the organization.

16. A system comprising:
one or more processors; and
one or more non-transitory computer-readable storage mediums storing instructions which, when executed by the one or more processors, cause the one or more processors to:
   receive, from an entity device associated with an entity, a request to execute a transaction between a blockchain of a computing system corresponding to an organization associated with the one or more processors and the entity device;
   extract, from a digital certificate in response to a determination that the blockchain is restricted to predetermined members, a component including a first entity identifier identifying the entity device;
   extract, from the digital certificate in response to a determination that the blockchain is compatible with requested from anonymous entity devices, the component including the first key identifier and a first public key;
   maintain, in a sanctioned list storage, a sanctioned entity blacklist having one or more second key identifiers, second entity identifiers and second public keys each indicating that a respective entity of has a sanctioned entity status prohibiting the respective entity from performing a transaction with the blockchain of the computing system;
   authenticate the entity device to the blockchain by identifying one or more of a first match between the first key identifier and one of the second key identifiers, a second match between the first public key and one of the second public keys, and a third match between the first entity identifier and one or more second entity identifiers;
   generate, responsive to one or more of the first match, the second match and the third match, an error condition indicating that the digital certificate failed validation;
   block, responsive to the generating the error condition, transaction between the entity device and the blockchain of the computing system; and insert, into a smart contract linked to the entity device responsive to the generating the error condition, code to prevent execution of the smart contract.

17. The system of claim 16, wherein the smart contract corresponds to an agreement that indicates that the organization agrees to provide resources associated with at least one of a cloud service and a blockchain.

18. The system of claim 16, wherein the sanctioned entity blacklist is a system-wide sanctioned entity blacklist accessible by a second organization.

19. The system of claim 16, wherein the one or more computer-readable storage mediums store instructions that cause the one or more processors to further:
provide a call-back function to an application executing on a computing device associated with the organization; and
receive an indication that a user of the computing device determined the sanctioned entity status associated with the entity based on the call-back function.

20. The system of claim 16, wherein the one or more computer-readable storage mediums store instructions that cause the one or more processors to further:
determine that a certificate path associated with the entity device is valid by performing a certificate path validation based on the digital certificate.

21. The system of claim 20, wherein the one or more processors performs the certificate path validation prior to determining the sanctioned entity status associated with the entity.

22. The system of claim 16, wherein the one or more computer-readable storage mediums store instructions that cause the one or more processors to further:
search, in the sanctioned entity blacklist, the digital certificate for at least one entity of the plurality of entities using an extract string search or an approximate string search.

23. The system of claim 16, wherein the one or more computer-readable storage mediums store instructions that cause the one or more processors to further:
compare one or more components of the digital certificate to the sanctioned entity blacklist; and
determine an occurrence of the one or more components in the sanctioned entity blacklist.

24. The system of claim 22, wherein the one or more components of the digital certificate comprises at least one of a name of the entity, an organization associated with the entity, and a geographic location associated with the entity.

25. The system of claim 23, wherein the smart contract corresponds to an agreement that indicates that the organization is a provider or a vendor of services associated with a permissionless blockchain, and wherein the one or more components of the digital certificate comprises at least one of the first key identifier and the first public key.

26. The system of claim 16, wherein the one or more computer-readable storage mediums store instructions that cause the one or more processors to further:
send, responsive to the generation of the error condition, a message to one or more members of the organization indicating that the entity requesting to execute the connection corresponding to the organization has sanctioned entity status.

27. The system of claim 16, wherein the one or more computer-readable storage mediums store instructions that cause the one or more processors to further:
store, responsive to the generation of the error condition, the error condition in an event journal.

28. The system of claim 16, wherein the one or more computer-readable storage mediums store instructions that cause the one or more processors to further:
deny, responsive to generating the error condition, the request to execute the connection corresponding to the organization associated with the one or more processors and the entity associated with the entity device.

29. The system of claim 16, wherein the one or more computer-readable storage mediums store instructions that cause the one or more processors to further:
generate the smart contract indicating an agreement between the organization associated with the one or more processors and a second entity associated with a second entity device,
wherein the smart contract comprises programming language code operable by the one or more processors to nullify the smart contract responsive to receiving an indication that the second entity is a member of the sanctioned entity blacklist.

30. A non-transitory computer-readable storage medium storing instructions which, when executed by one or more processors, cause the one or more processors to perform operations comprising:
receiving, by one or more processors and from an entity device associated with an entity, a request to execute a transaction between a blockchain of a computing system corresponding to an organization associated with the one or more processors and the entity device;
extracting from a digital certificate in response to a determination that the blockchain is restricted to predetermined members, a component including a first entity identifier identifying the entity device;
extracting, by the one or more processors and from the digital certificate in response to a determination that the blockchain is compatible with requests from anonymous entity devices, the component including the first key identifier and a first public key;
maintaining, in a sanctioned list storage, a sanctioned entity blacklist having one or more second key identifiers, second entity identifiers and second public keys each indicating that a respective entity has a sanctioned entity status prohibiting the respective entity from performing a transaction with the blockchain of the computing system;
authenticating the entity device to the blockchain by identifying one or more of a first match between the first key identifier and one of the second key identifiers, a second match between the first public key and one of the second public keys, and a third match between the first identity identifier and one or of the second entity identifiers;
generating, responsive to one or more of the first match, the second match and the third match, an error condition indicating that the digital certificate failed validation;
blocking, responsive to the generating the error condition, the transaction between the entity device and the blockchain of the computing system; and
inserting, by the one or more processors into a smart contract linked to the entity device responsive to the generating the error condition, code to prevent execution of the smart contract.

* * * * *